United States Patent [19]

Cuming

[11] Patent Number: 4,679,766

[45] Date of Patent: Jul. 14, 1987

[54] SOLENOID BOOSTER

[76] Inventor: Kenneth J. Cuming, 68 Robinson Road, Hawthorn, Victoria, Australia

[21] Appl. No.: 728,567

[22] Filed: Apr. 29, 1985

[30] Foreign Application Priority Data

May 1, 1984 [AU] Australia ............................ PG4778

[51] Int. Cl.[4] ...................... F16K 31/06; H01H 47/04

[52] U.S. Cl. .......................... 251/129.04; 251/129.01; 251/129.15; 361/154; 361/155; 137/870

[58] Field of Search ...................... 251/129.15, 129.01, 251/129.01; 251/30.02, 30.01; 361/155, 154; 137/870

[56] References Cited

U.S. PATENT DOCUMENTS

| | | | |
|---|---|---|---|
| 3,547,154 | 12/1970 | Benham | 137/624.11 |
| 3,549,955 | 12/1970 | Paine | 361/155 |
| 3,958,791 | 5/1976 | Carlson | 251/129.01 |
| 4,082,117 | 4/1978 | Peckham | 137/870 |
| 4,326,133 | 4/1982 | Tasma | 361/155 X |

FOREIGN PATENT DOCUMENTS

| | | | |
|---|---|---|---|
| 22478 | 5/1982 | Japan | 251/129.15 |
| 404986 | 3/1974 | U.S.S.R. | 251/129.15 |

*Primary Examiner*—Arnold Rosenthal

*Attorney, Agent, or Firm*—Bell, Seltzer, Park & Gibson

[57] ABSTRACT

The invention relates to a device adapted to reliably operate solenoids controlling valves at long distances from a central control station thereby enabling the use of light weight electrical cable between the control station and the solenoid, the device including a capacitor and a switching arrangement enabling current stored by the capacitor to be supplied to the solenoid to activate the solenoid, power being supplied to the capacitor from the central control station.

9 Claims, 4 Drawing Figures

SOLENOID BOOSTER

This invention relates to solenoid actuators and more particularly to means for ensuring operation of solenoids and for maintaining solenoid actuators in an energized condition.

Low voltage, generally 50 volts or less, alternating current solenoid actuators are extensively used in industry and domestic applications for controlling valves of various kinds. Solenoid actuators are also used in many other applications to control means other than valves.

One particularly common application of such low voltage solenoid actuators is to control water supply valves in watering systems for domestic and public gardens and other horticultural and agricultural situations. Such situations could include commercial crop growing and public or private sports grounds watering such as golf courses and the like.

However, a difficulty can arise in that substantially electric currents are required to initially open and maintain open such solenoid actuators and associated valves and this difficulty may necessitate use of heavy cable to minimize electric resistance losses and duplication of power sources for multiple valves to ensure that a single power source is not overloaded. Moreover in many agricultural and horticultural situations, the distance between a centrally located controller station and the solenoid valve combination operated therefrom can be quite large. As a result the cost of the electric cable between the controller station and the various solenoid valve combinations becomes very significant and this of course is greatly exacerbated by the need to use heavy cable to minimize resistance losses between the controller and the solenoid valve combinations.

Accordingly it is the principle objective of the present invention to provide a device adapted for use with a solenoid valve combination which will enable the use of light weight cable over long distances for the control of the solenoid valve combination.

In accordance with the present invention there is provided a device for energizing a solenoid, said device being adapted for location electrically adjacent to or integral with said solenoid and comprising a direct current charge storage means adapted for connection to a power source and switching means for applying current stored by said storage means to said solenoid to thereby energize the solenoid.

Conveniently the device might include a rectifier to provide a direct current supply to the charge storage means from an alternating current supply provided by the power source. Alternatively a suitable rectifier means might be provided associated with the power source to supply direct current to said charge storage means.

In accordance with a further preferred arrangement, the present invention provides a device for energizing a solenoid and maintaining the solenoid energized, said device being adapted for location electrically adjacent to or integral with said solenoid and comprising a direct current current charge storage means and switching means for applying current stored by said storage means to the solenoid to energize the solenoid and current limiting means adapted to limit current flow to the solenoid to not substantially above that direct current required to maintain the solenoid in energized condition.

Preferably the direct current is smoothed.

Without prejudice to the generality of the expression "not substantially above that direct current required to maintain the solenoid in energized condition", it is suggested that a current of 150% or less of that required should suffice.

Again as in the preceding arrangement a rectifier may form part of the device for energizing the solenoid and for maintaining the solenoid energized or may form part of the separate power source.

The current limiting means may be provided entirely or in part by electric cabling to the solenoid and this is particularly practical where long runs of cabling are required. However, it is preferred that the current limiting means may include a resistor forming part of the circuit of the device. That resistor may be a variable resistor. It is to be noted that it is generally desirable that the impedance of the means be high so that external impedance may be low. However, high external impedance such as may be due to cabling is not excluded.

The charge storage means may conveniently be a capacitor.

The switching means may take many forms but it is presently preferred to provide a zenner diode adapted to pass current on said storage means reaching a desired charge and a silicon controlled rectifier SCR which will be gated to open by current passing through the zenner diode.

The present invention also provides a water supply control system comprising:

at least one valve means arranged within a water supply line adapted to control the flow of water in said supply line;

a solenoid arranged to control operation of each said valve means;

a controller means including a power supply electrically connected to each said solenoid; and a solenoid control device electrically interposed between said controller means and at least one said solenoid, said solenoid control device being arranged to receive power from said power supply and to be located electrically adjacent to or integral with its associated solenoid, said solenoid control device comprising a direct current storage means and switching means for applying current stored by said storage means to the associated solenoid to thereby energize said associated solenoid.

The foregoing control system might be incorporated in any industrial, commercial, public utility or domestic water supply and control application.

The present invention has been found suitable for use with all low voltage alternating current solenoid valves presently available but in particular has worked well with Toro, Hydrorain, Rainbird and Richtel solenoid valves. Such valves normally require 24 volt A.C. and have an inrush energizing current of about 0.5 amp and a holding current of 0.2 amp at 24 volt A.C. Thus, the overall impedance of cable must be kept low so that voltage at the solenoid valve does not fall below the minimum required for reliable operation. Typically, if the total loop impedance of cabling exceeds 20 ohms, reliablility of valve operation may be jeopardized. However, if the present invention be utilized then more favourable results can be achieved.

The present invention will now be described with reference to several preferred arrangements illustrated in the accompanying drawings, in which.

Figure 1A:
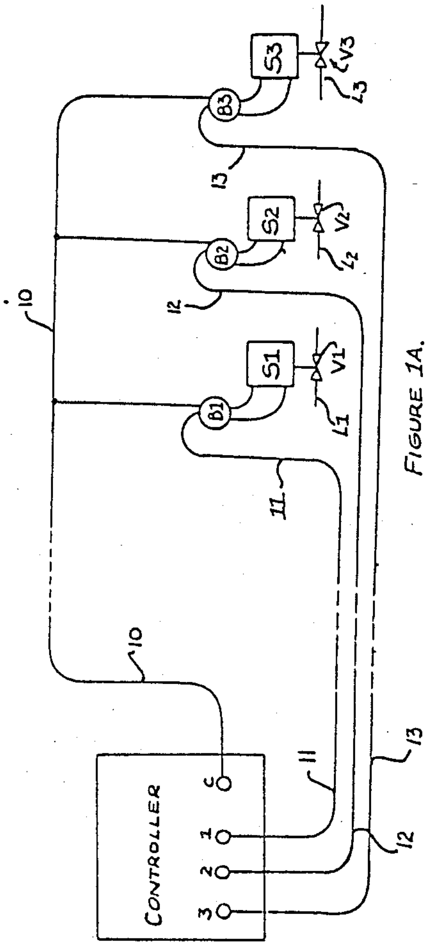
FIG. 1A is a schematic block diagram of a first possible water supply control system.
Figure 1B:
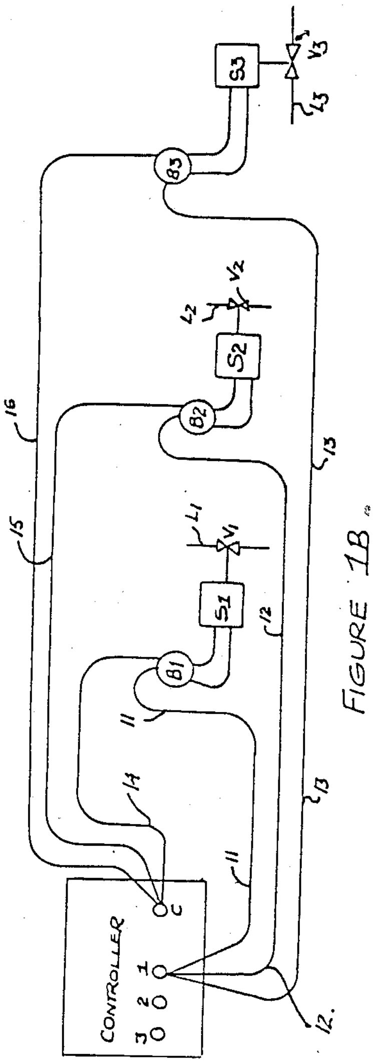
FIG. 1B is a schematic block diagram of an alternative arrangement to that shown in FIG. 1A.

Referring initially to FIGS. 1A and 1B there is shown valves V1, V2 and V3 each controlling water flow in a respective line L1, L2 and L3. Furthermore, actuation or control of the valves is effected by an associated solenoid S1, S2, S3. It will of course be appreciated that the system illustrated shows the control of three valves V1, V2 and V3, however, any number of valves could be controlled with suitable modifications to the system illustrated. A solenoid control device B1, B2 or B3 is shown electrically connected to a respective one of the solenoids S1, S2 and S3 and arranged adjacent electrically to the solenoids. Of course the control devices might equally be built directly into the control systems of the solenoids. Each solenoid control device B1, B2 or B3 is also electrically connected to a centrally located controller including a suitable power supply. The controller may include a number of separate stations such as stations 1, 2 and 3 illustrated. Provided that there are sufficient control stations on the controller, one common return electric cable 10 might be provided for all the solenoid control devices with separate cables 11, 12 and 13 extending from the control stations to each of the solenoid control devices. It will be appreciated that the valves V1, V2 and V3 might be located long distances away from the controller and therefore great amounts of electric cable could be needed for any practical installation.

FIG. 1B illustrates a situation where there might be insufficient control stations on the controller for the number of valves being controlled. In this situation more than one control device B1, B2, B3 might be required on each control station and each must be wired back separately to the controller, for example by cables 14, 15 and 16. Naturally, in such situations the usage of electric cable is greatly exacerbated.

Figure 2:
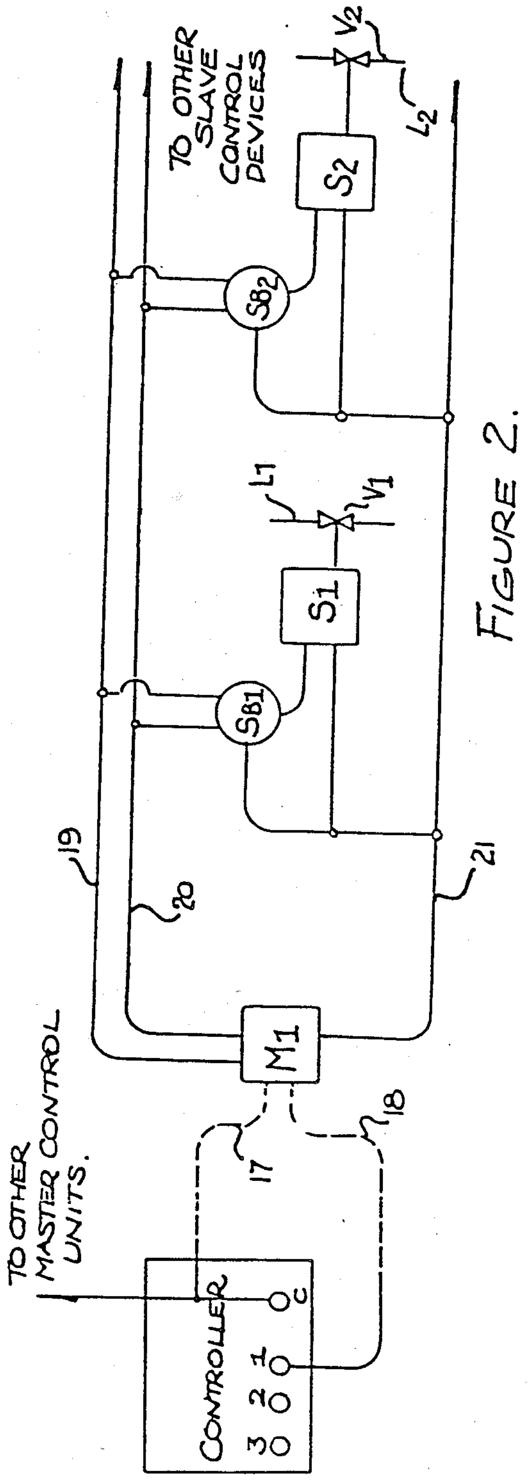
FIG. 2 is a schematic block diagram similar to FIGS. 1A and 1B showing a further alternative arrangement.

FIG. 2 shows another possible arrangement enabling more than one solenoid controlling device (slave controllers) SB1 and SB2, to operate in the field from one set of wires 17,18. In this arrangement, a master control unit M1 is located reasonably close to the slave controllers SB1 and SB2, the solenoids S1 and S2 and the controlled valves V1 and V2. The slave controllers and solenoids are located between common electric cables 19, 20 and 21 leading from the master control unit M1.

Figure 3:
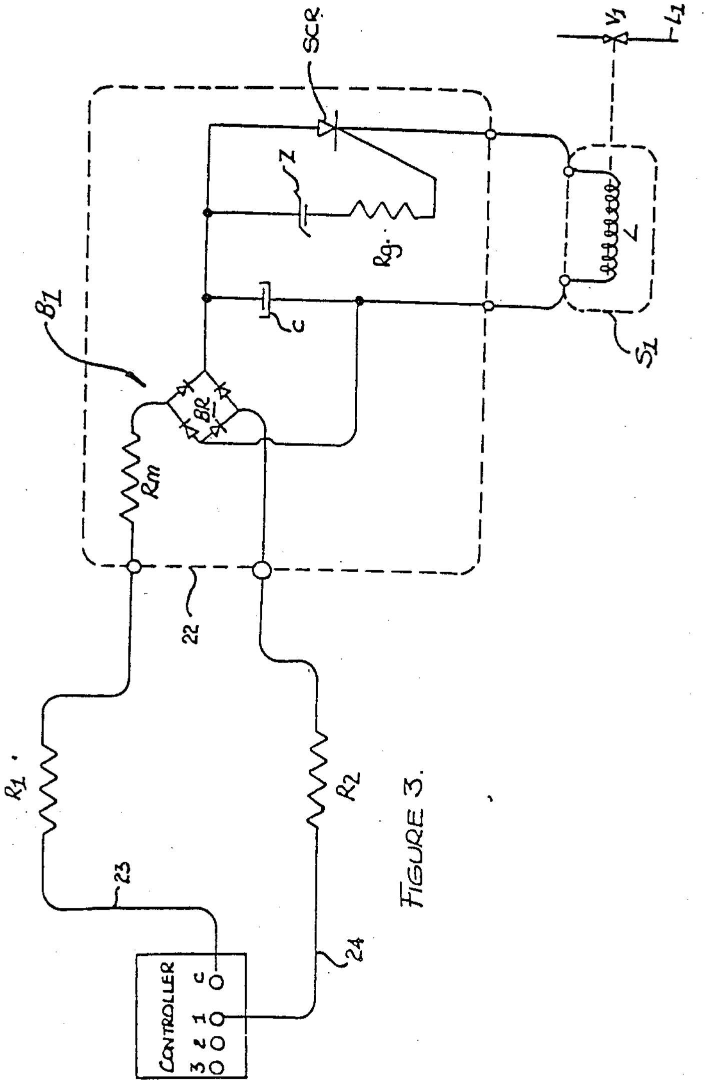
FIG. 3 is a circuit diagram illustrating a preferred embodiment of a solenoid controlling device according to the present invention.

Reference will now be made to FIG. 3 which specifically illustrates one preferred circuit arrangement of the solenoid control devices B1, B2 or B3 or the slave controllers SB1 and SB2 described above. The controller preferably includes a 24 volt A.C. power supply which is connected to a controller device 22 by electric cables 23 and 24. The controller device might, for example be the control device B1 of FIG. 1A. In practical installations the cables 23 and 24 would be quite long and would effectively act as resistances $R_1$ and $R_2$.

Within the controller device 22 there is provided in the system which are diagrammatically indicated as resistances, a resistance Rm, a rectifier bridge BR, a capacitor C, a zenner diode Z, a gating resistance Rg and a silicon controlled rectifier diode SCR. The resistance Rm might conveniently be a variable resistor. The circuit in the device 22 is connected to a winding L of a solenoid such as solenoid S1 of FIG. 1A which in turn is intended to operate valve V1 in a water supply line L1. The manner of operation of the device 22 is as follows:

The rectifier bridge BR produces a D.C. current and charges the capacitor C at a rate controlled by the impedances of resistances $R_1$, $R_2$, Rm, the bridge circuit BR and the capacitance of capacitor C.

When the voltage across the capacitor C reaches the conducting voltage of the zenner diode Z the zenner diode A conducts and applies current via the gating resistor Rg to the rectifier diode SCR from the capacitor C.

As a result, the winding L of the solenoid S1 is pulsed and will cause the valve V1 to open.

As voltage will normally be maintained from the power source 1, the rectifier diode SCR will continue to conduct and will allow sufficient current to flow through the winding L to keep the valve open. That sufficient current will be a relatively low current and hence the cable resistance $R_1$ and $R_2$ can be relatively high as will occur if small size cable is used.

In consequence, it is possible to use quite small or light weight electric cable in the system while still maintaining effective and reliable operation of the solenoid and valve combination.

The resistance Rm can be of low impedance and act as a limiting resistance in the event that $R_1$ and $R_2$ are low resistances.

Modifications and adaptations may be made to the above described without departing from the spirit and scope of this invention which includes every novel feature and combination of features disclosed herein.

I claim:

1. A device for energizing a solenoid being adapted for location electrically adjacent to or integral with the solenoid, said device comprising a circuit means for electrically connecting said device to the solenoid, a direct current charge storage means connected in said circuit in parallel to the solenoid, a rectifier means connected in said circuit for providing a direct current supply to said direct current charge storage means from an alternating current supply provided by a power source, monitoring means for determining when the storage means has reached a desired charge sufficient to energize the solenoid, and switching means connected in said circuit for automatically passing current stored by said storage means to the solenoid in response to said monitoring means determining that said storage means has reached a desired charge for energizing the solenoid.

2. A device according to claim 1 further including current limiting means connected in said circuit for limiting current flow to the solenoid.

3. A device according to claim 1 wherein said charge storage means comprises a capacitor.

4. A device according to claim 1 wherein said monitoring means comprises a zenner diode means for passing current when said storage means reaches the desired charge and said switching means comprises a silicon controlled rectifier for being gated to open by current passing through said zenner diode.

5. A device according to claim 1 and further including current limiting means connected in said circuit for limiting current flow to the solenoid to not substantially above that direct current required to maintain the solenoid in energized condition.

6. A water supply control system comprising:

at least one valve means adapted to be arranged within a water supply line to control the flow of water in the supply line;

a solenoid operatively connected to and controlling operation of each of said valve means;

a controller means, including an alternating current power supply, electrically connected to each said solenoid; and a solenoid control device electrically interposed between said controller means and at least one said solenoid, said solenoid control device being arranged to receive power from said power supply and to be located electrically adjacent to or integral with its associated solenoid, said solenoid control device comprising a circuit means for electrically connecting said device to the solenoid, a direct current charge storage means connected in said circuit in parallel to the solenoid, a rectifier means connected in said circuit for providing a direct current supply to said direct current charge storage means from said alternating current power supply, monitoring means for determining when the storage means has reached a desired charge sufficient to energize the solenoid, and switching means connected in said circuit for automatically passing current stored by said storage means to the solenoid in response to said monitoring means determining that said storage means has reached a desired charge to thereby energize the solenoid.

7. A water supply control system according to claim 6 wherein a plurality of said valves, said solenoids and said solenoid control devices are provided, and wherein one of said solenoid control devices is operably connected with each said solenoid.

8. A water supply control system according to claim 6 wherein said monitoring means comprises a zenner diode means for passing current when said storage means reaches the desired charge and said switching means comprises a silicon controlled rectifier for being gated to open by current passing through said zenner diode.

9. A water supply control system according to claim 6 wherein said solenoid control device includes current limiting means connected in said circuit for limiting current flow to the associated said solenoid.

* * * * *